J. W. WEST.
Spooling-Machine.

No. 160,292.                              Patented March 2, 1875.

Witnesses;                    Inventor;
C. A. Shaw.
H. E. Metcalf.                John W. West.

UNITED STATES PATENT OFFICE.

JOHN W. WEST, OF BOSTON, ASSIGNOR OF ONE-HALF HIS RIGHT TO AUGUSTUS SEAVER, OF MILFORD, MASSACHUSETTS.

IMPROVEMENT IN SPOOLING-MACHINES.

Specification forming part of Letters Patent No. 160,292, dated March 2, 1875; application filed October 31, 1874.

*To all whom it may concern:*

Be it known that I, JOHN W. WEST, of Boston, in the county of Suffolk, State of Massachusetts, have invented a certain new and useful Improvement in Spooling - Machines, of which the following is a description sufficiently full, clear, and exact to enable any person skilled in the art or science to which my invention appertains to make and use the same, reference being had to the accompanying drawing forming a part of this specification, in which—

Figure 1:
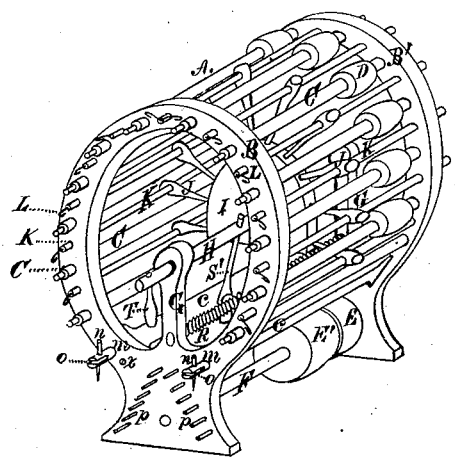
Figure 2:
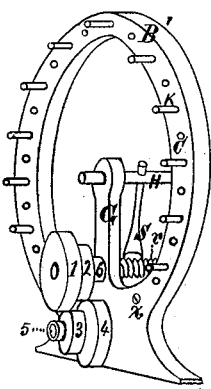

Figure 1 is an isometrical perspective view of my improved machine, and Fig. 2 an end view of the same.

Like letters of reference indicate corresponding parts in the different figures of the drawing.

My invention relates more especially to that class of spoolers which are designed for use in large manufactories; and consists in a novel construction and arrangement of the parts, as hereinafter more fully set forth and claimed, by which the capacity and effectiveness of the machine are very largely increased.

In the drawing, A is the main frame of the machine, which consists of the circular heads B B', connected by the cross - bars c and screws x. A series of rods or spool-holders, C, provided with the pulleys D, are disposed in the heads B B' in such a manner as to be easily revolved therein, the ends of the rods projecting through the head B a short distance to receive the spool. Between each pair of the revolving spool-holders there are a series of sliding rods, K, the ends of which also project through the head B, and are fitted with the hooks or thread-guides L. Centrally arranged in the heads B B' there are two uprights or standards, G G, in which is disposed a sliding rocker - shaft, H, and the right and left hand screw R r. Upon the shaft H there is a stock, I, provided with the radial arms or spokes J, one of which extends to, and is made fast on, each of the guide-rods K, the rod H being arranged to partially revolve in, but not to slide through, the stock.

Projecting downwardly from the shaft H are two arms, S' S, provided at their lower ends with segmental screws or nuts, the screw on the arm S corresponding with the right - hand screw r on the shaft, and the screw on the arm S' with the left-hand screw R on the same shaft. The arms S' S are also arranged in the shaft H, so that when the arm S' is in contact with the screw R the arm S will be disengaged from the screw r, and vice versa.

Disposed in the lower part of the machine are two pulleys, E E', mounted upon the main shaft F. This shaft also carries upon one of its outer ends the cone-pulley 3 4 5, Fig. 2, which is designed to be belted to the corresponding cone-pulley 1 2 6 on the end of the right and left hand screw-shaft. Projecting horizontally from the head B are a series of spindles, p p, and two tension-guides, m m, provided with the slots o o and pins n n. A counter-belt is designed to pass from the pulley E around the pulleys D, the machine being actuated by a main belt passing over the pulley E'.

From the foregoing the nature and operation of my invention will be readily understood by all conversant with such matters.

In using my improved machine, the bobbins from which the spools are to be filled are placed upon the spindles p p, the threads from the same being carried through the guides m m and L to the spools, which are secured upon the ends of the shafts C. The arm S' being in contact with the screw, if power is now applied to the pulley E' the rods C will be revolved by means of the belt from the pulley E, and the shaft H caused to slide longitudinally in the standards G G, carrying with it the stock I and guide-rods K, by means of which the threads will be regularly laid or properly wound upon the spools. When the guide-rods have moved a sufficient distance to traverse the spools the operator tending the machine swings the handle T of the shaft H to the left, and thus reverses the motion of the rods by disengaging the arm S' into contact with the screw, and so on until the spools are completely filled.

By arranging the spool-holding and thread-guiding rods in the arc of a circle about the actuating mechanism in the manner described, the work of spooling is brought more directly under the eye of the operator, and the capacity of the machine greatly increased without a corresponding increase in the help required to tend it.

Having thus explained my invention, what I claim is—

In a spooling-machine constructed substantially as described, the combination of the shaft H, provided with the arms S S', stock I, provided with the radial arms J, rods C K, and screw R r, substantially as and for the purpose set forth.

JOHN W. WEST.

Witnesses:
C. A. SHAW,
H. E. METCALF.